(12) United States Patent
Bunker

(10) Patent No.: US 8,572,981 B2
(45) Date of Patent: Nov. 5, 2013

(54) SELF-OSCILLATING FUEL INJECTION JETS

(75) Inventor: Ronald Scott Bunker, Waterford, NY (US)

(73) Assignee: General Electric Company, Niskayuna, NY (US)

( * ) Notice: Subject to any disclaimer, the term of this patent is extended or adjusted under 35 U.S.C. 154(b) by 23 days.

(21) Appl. No.: 12/941,340

(22) Filed: Nov. 8, 2010

(65) Prior Publication Data

US 2012/0111015 A1    May 10, 2012

(51) Int. Cl.
F23R 3/14    (2006.01)

(52) U.S. Cl.
USPC .......................................................... 60/748

(58) Field of Classification Search
USPC ........................................... 60/748, 749, 750
See application file for complete search history.

(56) References Cited

U.S. PATENT DOCUMENTS

| | | | | |
|---|---|---|---|---|
| 3,455,108 A | * | 7/1969 | Clare et al. | 60/749 |
| 3,510,239 A | * | 5/1970 | Partiot | 431/328 |
| 3,825,403 A | * | 7/1974 | Gottschall | 431/328 |
| 5,857,339 A | * | 1/1999 | Roquemore et al. | 60/749 |
| 6,151,899 A | * | 11/2000 | Park | 60/748 |
| 6,481,209 B1 | * | 11/2002 | Johnson et al. | 60/750 |
| 6,599,121 B2 | | 7/2003 | Gutmark et al. | |
| 6,715,983 B2 | | 4/2004 | Koshoffer et al. | |
| 7,057,326 B2 | * | 6/2006 | Ren et al. | 310/261.1 |
| 7,661,267 B2 | | 2/2010 | Pollarolo | |
| 7,703,707 B2 | | 4/2010 | Yasukawa et al. | |
| 2008/0104961 A1 | * | 5/2008 | Bunker | 60/737 |
| 2009/0034360 A1 | | 2/2009 | Tho et al. | |
| 2010/0011770 A1 | * | 1/2010 | Chila et al. | 60/737 |
| 2010/0074757 A1 | * | 3/2010 | Headland | 416/227 R |
| 2011/0023494 A1 | * | 2/2011 | Butler et al. | 60/748 |
| 2012/0042655 A1 | * | 2/2012 | Lam | 60/737 |

OTHER PUBLICATIONS

M. W. Plesniak et al., "Scalar mixing in a confined rectangular jet in crossflow," Journal Fluid Mechanics, vol. 524, 2005, pp. 1-45.
R. J. Chila et al., "Gas Turbine Premixer with Cratered Fuel Injection Sites," U.S. Appl. No. 12/176,510, filed Jul. 21, 2008.

* cited by examiner

*Primary Examiner* — Ted Kim
(74) *Attorney, Agent, or Firm* — Ann M. Agosti

(57) ABSTRACT

A combustor structure includes a combustor fuel-air mixing apparatus having a mainstream airflow region. One or more concavities are disposed within the mainstream airflow region of the fuel-air mixing apparatus. At least one fuel injection hole is disposed within an upstream base region of at least one concavity. Passing a stream of air through the main airflow region causes fuel injected into the upstream base region of at least one concavity to passively mix with a naturally oscillating vortex of air within the concavity.

2 Claims, 5 Drawing Sheets

SELF-OSCILLATING FUEL INJECTION JETS

BACKGROUND

This invention generally relates to combustion dynamics, and more particularly, to systems and methods for efficient mixing of fuel and air within a compact space such as the mainstream air flow of a combustor.

Combustion dynamics occur when the inherent unsteadiness of a flame couples with the natural modes of a combustor and establishes a feedback cycle leading to high amplitudes of pressure perturbations and potential significant damage to the corresponding hardware. Combustion dynamics are known to plague gas turbines for power generation, prime-mover, aviation, and marine applications.

Combustion dynamics is a universal issue with and presents one of the biggest challenges faced by gas turbine manufacturers since the introduction of premixed combustion systems. Various techniques have been employed to address combustion dynamics, including without limitation, altering the generation mechanism, varying the combustor dimensions or damping, and control/suppression of the problem by using active/passive devices/methods.

Combustion dynamics has led to catastrophic combustor damage/failure when observed at very high amplitudes. Even when less severe, it restricts the operational envelope of a gas turbine and hinders the best possible performance. Combustion dynamics is still a pervasive problem with existing and installed gas turbines. Further, with stricter emissions regulations and fuel-flexibility, the problems relating to combustion dynamics are expected to get worse.

One significant issue related to combustion dynamics is directed to efficient mixing of fuel and air within a compact space such as the mainstream air (oxidant) flow tube of a combustor. Presently, injection fuel holes are generally cylindrical and oriented to create normal injection jets. One technique for improving mixing of fuel and air within the mainstream air flow of a combustor includes the use of swirler mechanisms. Swirlers are however, complex in terms of both cost and structure. Further, swirlers generally employ moving parts which adversely impacts system reliability. Some known common structures create high losses aerodynamically and can lead to localized flame holding or flashback. To date, dynamics and acoustics issue resolution has focused generally on active modulation of the fuel injection, rather than passive techniques.

In view of the foregoing, there is a need for a system and method for passively and efficiently mixing of fuel and air within a compact space such as the mainstream air (oxidant) flow of a combustor to achieve optimal operational performance in terms of acoustics, emissions and power output. The system should be simple in terms of structure when compared to known structures for improving mixing of fuel and air with the compact space.

BRIEF DESCRIPTION

One embodiment of the present disclosure is directed to a combustor structure, comprising:
  a combustor comprising a fuel injector; and
  one or more concavities disposed within a mainstream airflow region of the fuel injector, wherein at least one fuel injection hole is disposed within an upstream base region of at least one concavity.

Another embodiment of the present disclosure is directed to a combustor structure, comprising:
  one or more concavities disposed within a mainstream airflow region of a combustor; and
  one or more fuel injection ports disposed within an upstream base region of at least one concavity.

According to yet another embodiment, a method of operating a combustor comprises:
  providing one or more concavities within a mainstream airflow region of a combustor; and
  injecting a fuel into the main air flow region via a fuel injection orifice disposed within an upstream base region of at least one concavity.

DRAWINGS

These and other features, aspects, and advantages of the present invention will become better understood when the following detailed description is read with reference to the accompanying drawing, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Fuel injection for gaseous fuels, such as natural gas, is commonly achieved by jet injection normal to the surface in a transverse cylinder or by a shaped obstacle placed in the mainstream air flow. The shaped obstacle may be, for example, a shaped strut or pylon inserted into the mainstream air (oxidant) flow of a combustor. To date, jet injection techniques generally employ circular fuel injection holes, some of which are known to terminate in a cratered hole structure.

The embodiments described herein commonly employ fuel hole injection into the upstream base region of a concavity. The concavity embodiments described herein may be employed in gas turbines for power generation, prime-mover, aviation, and marine applications, among other places. The present inventors recognized that fuel injected into this location experiences a localized unsteady mixing operation with the mainstream air within the concavity that is subsequently expelled as a mixture in the vortex since the vortex is oscillatory from side to side for typical turbulent flow conditions within a fuel injection region. This feature creates a broad region of fuel-air mixing via the self-oscillation nature of this mixing flow to help negate combustor acoustics related issues.

Figure 2:
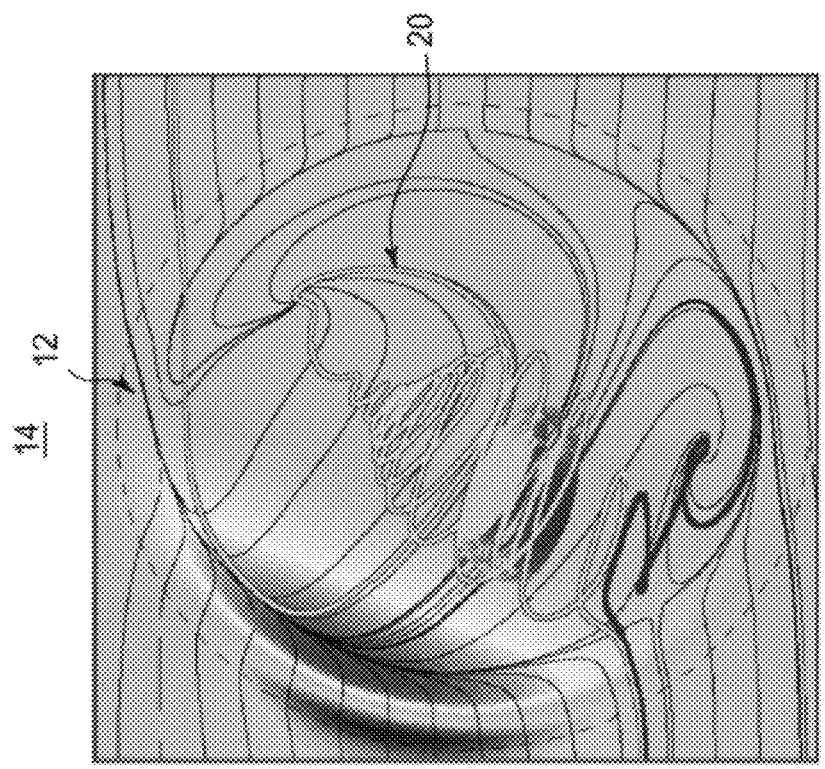
FIG. 2 illustrates dominant vorticity due to a local fluid pressure field over a concavity without injection for another predefined Reynolds number.
Figure 1:
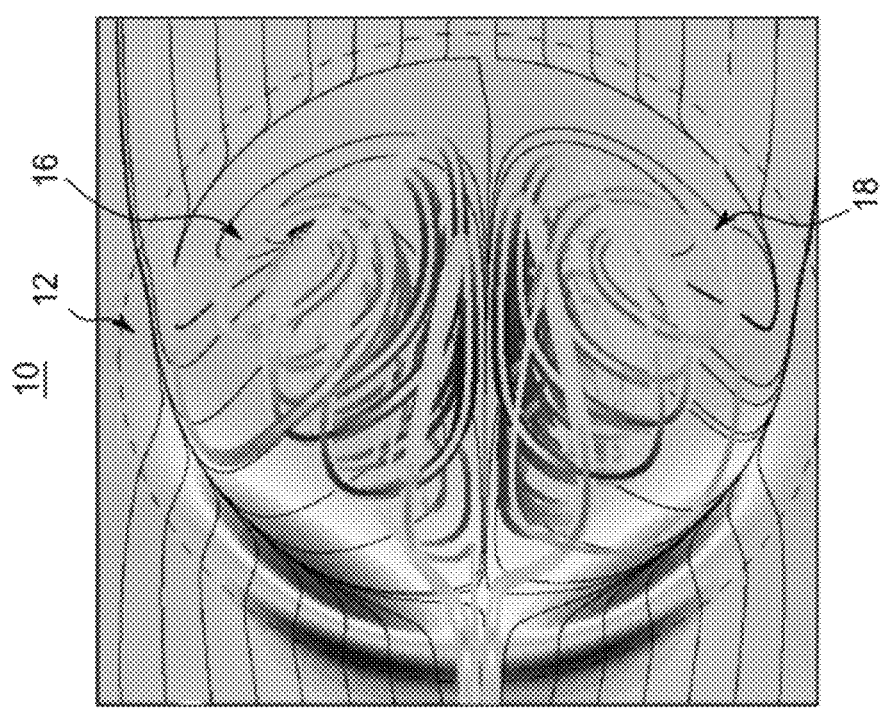
FIG. 1 illustrates paired vorticity due to a local fluid pressure field over a concavity without injection for a predefined Reynolds number.

FIG. 1 illustrates a predicted paired vorticity field 10 due to a local fluid pressure field over a concavity 12 without fuel injection for a predefined flow Reynolds number; while FIG. 2 illustrates a predicted singular vorticity field 14 due to a local fluid pressure field over a concavity 12 without fuel injection for another predefined flow Reynolds number. Regardless of whether the turbulent vorticity field comprises paired vortices 16, 18 such as depicted in FIG. 1, or a single vortex 20 such as depicted in FIG. 2, the vortices are oscillating from side to side. This passively oscillatory nature allows for creation of a broad region of fuel-air mixing using the principles described herein with reference to particular embodiments wherein fuel injection holes may vary in size, shape and number.

Figure 3:
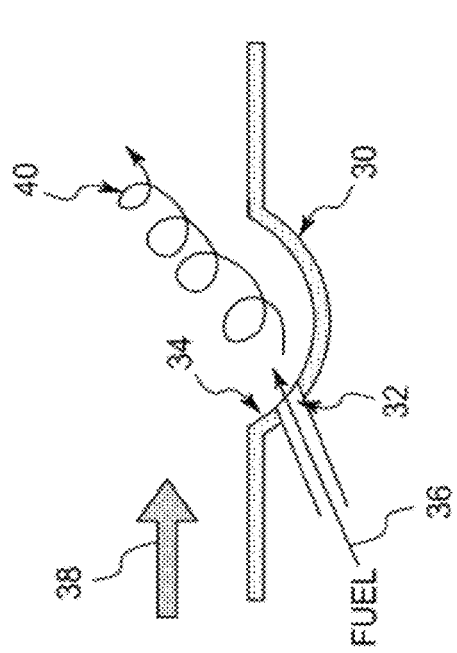
FIG. 3 illustrates a single concavity including a discrete fuel hole disposed in the upstream base region of the concavity for injection of fuel into a mainstream of air flowing within the concavity, according to one embodiment.

FIG. 3 illustrates a single concavity 30 including a discrete fuel hole 32 disposed in the upstream base region 34 of the concavity for injection of fuel 36 into a mainstream of air 38 flowing within the concavity 30, according to one embodiment. The shape of the concavity 30 may vary, although a substantially spherical section is desirable to provide enhanced fuel-air mixing according to the principles described herein. The depth of the concavity 30 relative to its surface diameter is one characteristic that may be employed to control or set the intensity of the expelled mixing vortex 40.

Figure 4:
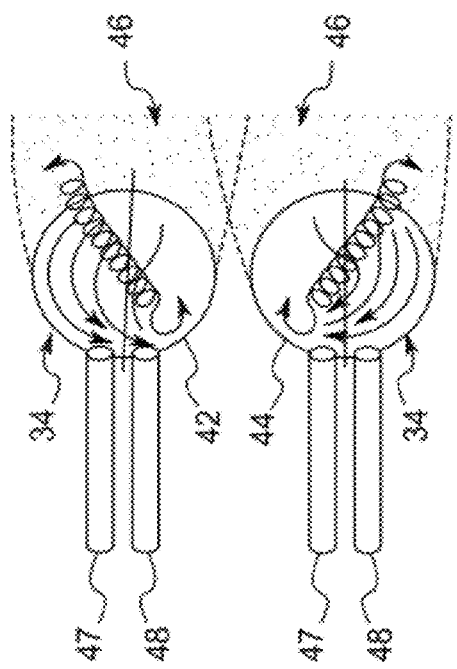
FIG. 4 illustrates a pair of concavities configured to provide enhanced regional fuel-air mixing, each concavity including a pair of discrete fuel injection holes disposed in the upstream base region of the concavity, according to one embodiment.

FIG. 4 illustrates a pair of concavities 42, 44 configured to provide enhanced regional fuel-air mixing, wherein each concavity includes a pair of discrete fuel injection holes 47, 48 disposed in the upstream base region 34 of the concavity, according to one embodiment. Spacing between adjacent concavities 42, 44 determines the extent of fuel mixing within the overall flow region 46.

Figure 5:
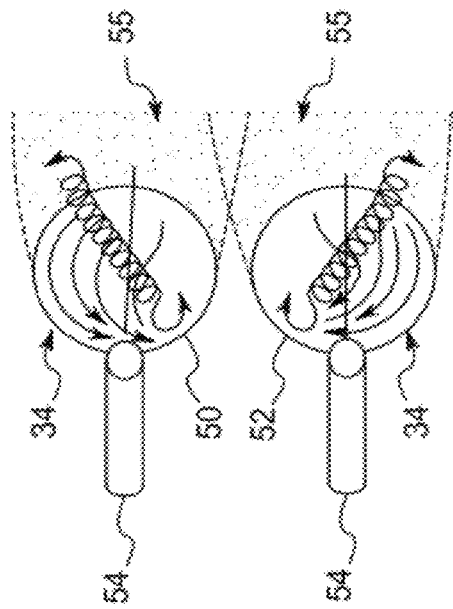
FIG. 5 illustrates a pair of concavities configured to provide enhanced regional fuel-air mixing, each concavity including a singular fuel injection hole disposed in the upstream base region of the concavity, according to one embodiment.

FIG. 5 illustrates a pair of concavities 50, 52 configured to provide enhanced regional fuel-air mixing, wherein each concavity includes a singular fuel injection hole 54 disposed in the upstream base region 34 of the concavity, according to another embodiment. Similar to FIG. 4, spacing between adjacent concavities 50, 52 determines the extent of fuel mixing within the corresponding overall flow region 55.

Figure 6:
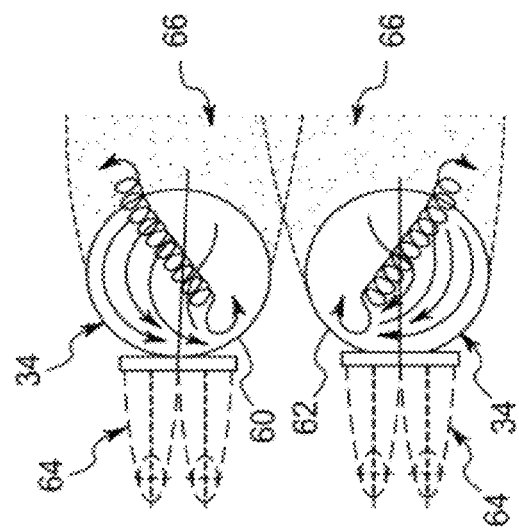
FIG. 6 illustrates a pair of concavities configured to provide enhanced regional fuel-air mixing, each concavity including a pair of diffuser shaped fuel injection holes configured to inject fuel into the upstream base region of the concavity, according to one embodiment.

FIG. 6 illustrates a pair of concavities 60, 62 configured to provide enhanced regional fuel-air mixing, wherein each concavity includes a pair of diffuser shaped fuel injection holes 64 configured to inject fuel into the corresponding upstream base region 34 of the concavities 60, 62, according to another embodiment. Spacing between adjacent concavities 60, 62 determines the extent of fuel mixing within the corresponding overall flow region 66, similar to the embodiments described herein with reference to FIGS. 4 and 5.

Figure 7:
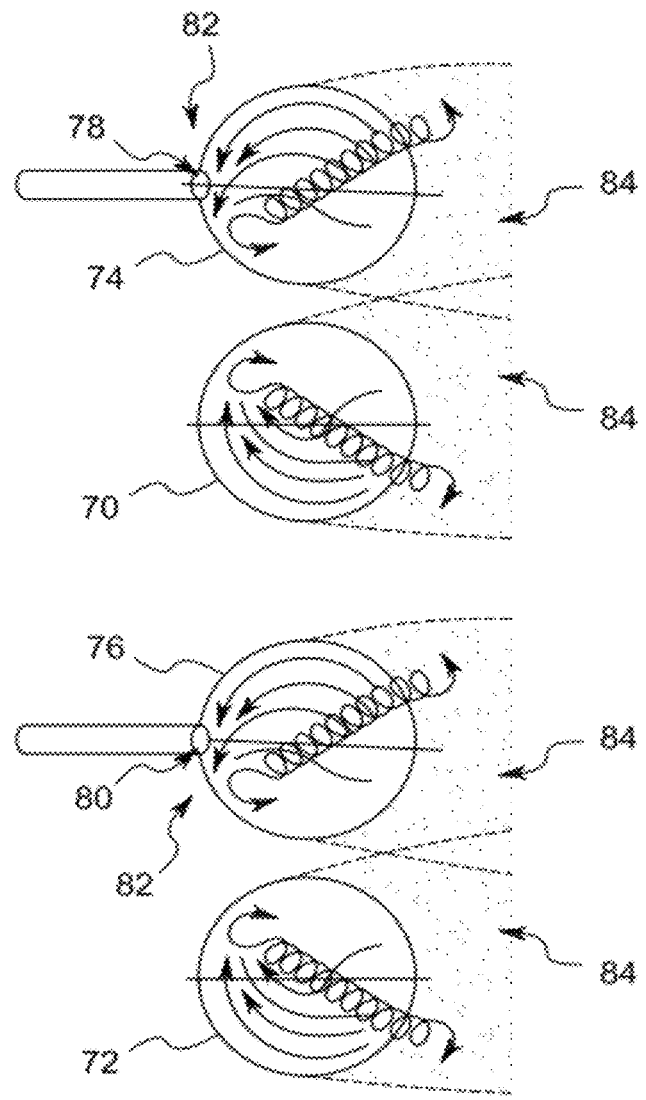
FIG. 7 illustrates a plurality of concavities without fuel injection holes configured together with a plurality of concavities including fuel injection holes to provide enhanced regional fuel-air mixing, according to one embodiment.

According to one aspect, one or more concavities without fuel injection holes may be used next to those having fuel injection holes to provide enhanced fuel-air mixing. FIG. 7 for example, illustrates a plurality of concavities 70, 72 without fuel injection holes configured together with a plurality of concavities 74, 76 including fuel injection holes 78, 80 to provide enhanced regional fuel-air mixing, according to another embodiment. According to one aspect, the angle of each injection hole 78, 80 relative to the mainstream surface 82 may be used to optimize fuel-air mixing in the overall flow region 84.

In summary explanation, discrete fuel hole injection into the upstream base region of a concavity is employed to provide a localized unsteady mixing operation at a combustor fuel injection location creating a broad region of fuel-air mixing. This technique may easily be employed with current dry low nitrogen (DLN) type injectors and may advantageously provide a broader range of fuel-air mixing options with lower losses and less flame holding issues when compared to known fuel-air mixing techniques such as injection jet interaction with an obstruction such as a crater edge. Further, discrete fuel hole injection into the upstream base region of a concavity may be employed via a concavity without a machined edge, yet creating a lower differential pressure loss unsteady mixing of fuel and air. Since the embodiments described herein provide a passive self-oscillating fuel injection structure, they advantageously may reduce acoustics and acoustically coupled heat generation issues among other combustor dynamics.

Figure 8:
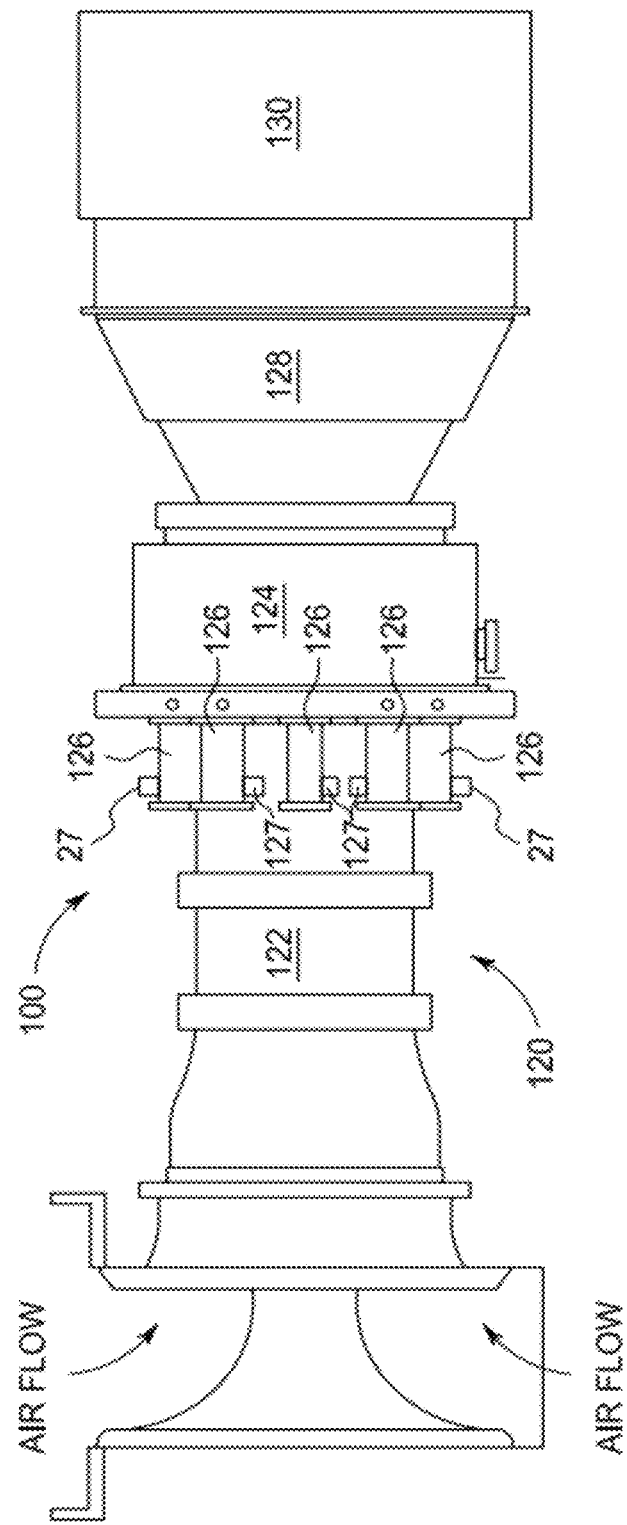
FIG. 8 illustrates a gas turbine engine that may be configured with concavities depicted in FIGS. 3-7.

FIG. 8 illustrates an exemplary gas turbine system 100 that may employ fuel hole injection into the upstream base region of a concavity using the principles described herein. Turbine system 100 may have, among other systems, a gas turbine engine 120. Gas turbine engine 120 includes a compressor section 122, a combustor section 124 including a plurality of combustor cans 26 that may be configured to employ fuel hole injection into the upstream base region of a concavity using the principles described herein and a corresponding ignition system 127, and a turbine section 128 coupled to compressor section 122. An exhaust section 130 channels exhaust gases from gas turbine engine 120.

In general, compressor section 122 compresses incoming air to combustor section 124 that mixes the compressed air with a fuel and burns the mixture to produces high-pressure, high-velocity gas. Turbine section 128 extracts energy from the high-pressure, high-velocity gas flowing from the combustor section 124. Only those aspects of gas turbine system 100 useful to illustrate the embodied combustion process have been described herein to enhance clarity and preserve brevity.

Compressor section 122 may include any device capable of compressing air. This compressed air may be directed to an inlet port of combustor section 124. Combustor section 124 may include a plurality of fuel injectors configured to mix the compressed air with a fuel and deliver the mixture to one or more combustor cans 126 of combustor section 124. The fuel delivered to each combustor can 126 may include any liquid or gaseous fuel, such as diesel or natural gas. The fuel delivered to any combustor can 126 may undergo combustion to form a high pressure mixture of combustion byproducts. The resultant high temperature and high pressure mixture from combustor section 124 may be directed to turbine section 128. Combustion gases may then exit turbine section 128 before being discharged to the atmosphere through exhaust section 130.

Figure 9:
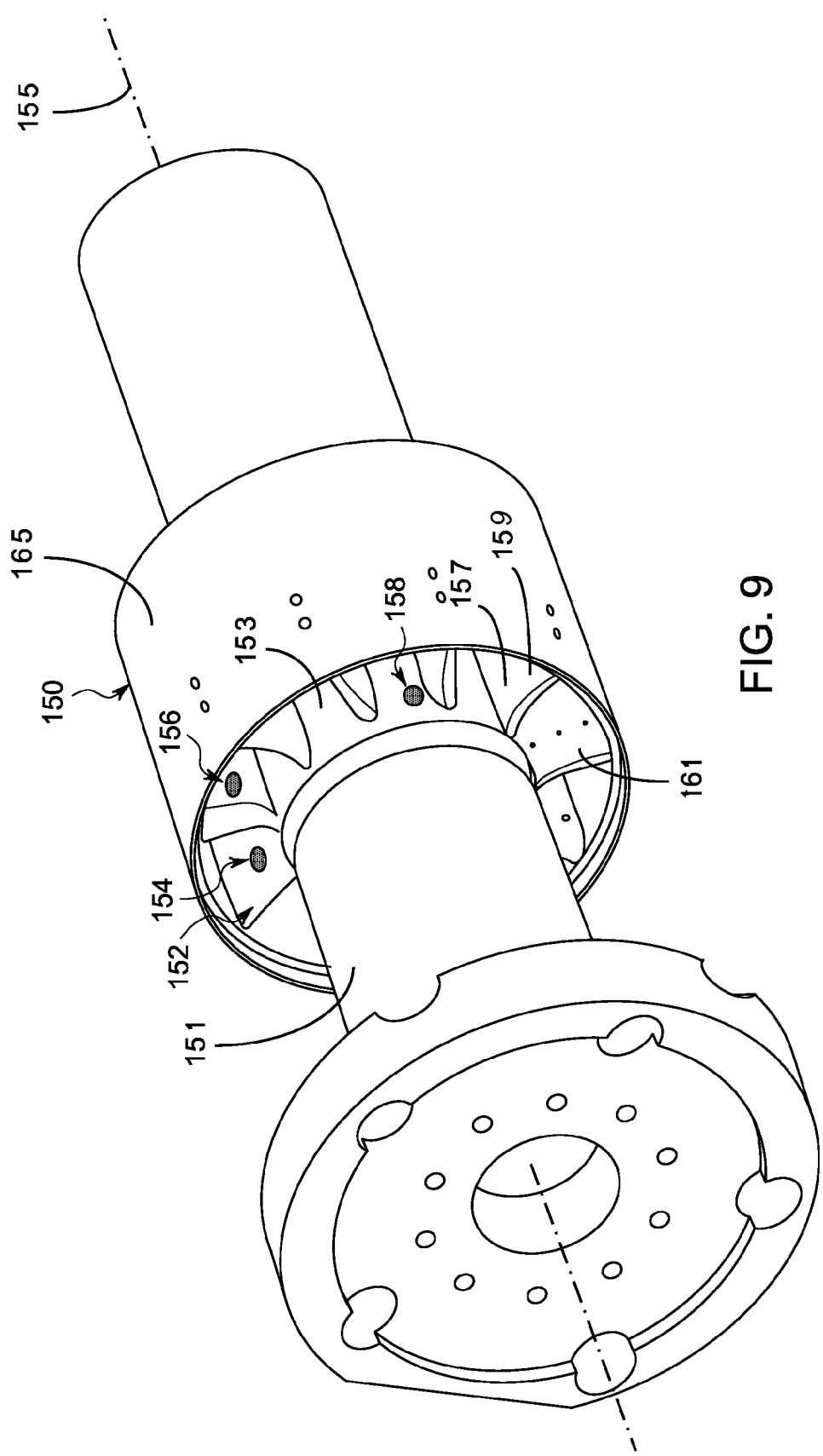
FIG. 9 illustrates a fuel injector configures with concavities, according to one embodiment.

FIG. 9 illustrates one embodiment of a fuel injector 150 that may be employed for use in a gas turbine. Fuel injector 150 comprises a plurality of angled vanes 152 that provide premixer swirl to the overall flow to create flow recirculation regions that assist in stabilizing the combustion zone, and increase residence time to allow ignition and improve combustion efficiency. The exemplary fuel injector 150 comprises a body 151 having a hub 153 that extends circumferentially around a central axis 155. The vanes 152 extend from the hub 153 to an outer annular shroud 165 and are arranged in a circumferential direction on the hub 153 around the central axis 155. Each vane 152 has a root portion 157 located radially near the hub 153 and a tip portion 159 located radially near the outer annular shroud 165. Each vane 152 has a leading edge 161 and a trailing edge (not visible) that extend between the root portion 157 and the tip portion 159. The vanes 152 have a suitable shape, such as, for example, an airfoil shape, between the leading edge 161 and the trailing edge. Adjacent vanes form a flow passage for passing air that enters the fuel injector 150. The vanes 152 can be angled relative to the central axis 155 to impart a rotational component of motion to the incoming air that enters the fuel injector 150. These angled vanes 152 cause the air to swirl in a generally helical manner within the fuel injector 150. In one aspect, the plurality of vanes 152 include concavities 154, 156, 158 disposed thereon, wherein each concavity is configured to passively mix injected fuel with an oscillating vortex of air flowing within the concavity. The oscillating vortex of air is generated via a main air flow passing through the main air passage of the fuel injector 150. Fuel is injected into an upstream base region of at least one concavity to provide the desired passive fuel-air mixing created via the corresponding oscillating vortex of air. Although the concavities are depicted as disposed within the outer surface of angled vanes 152, the desired fuel-air mixing can also be achieved for particular applications via disposing concavities within an inner wall surface of the fuel injector 150 itself or any other portion of a combustor main air flow passage where fuel-air mixing is required.

It is noted that the angled vanes 152 described herein with reference to FIG. 9 are generally employed in association with a premixing swirler and are not the same as the "obstructions" otherwise generally noted in the text. The more commonly used industry obstructions referenced herein may include, without limitation, flame holders, such as V-gutters or cylindrical cups. Although injection may be well mixed by the angled vanes 152, the concavities 154, 156, 158 additionally prevent flame holding within the premixer device using the principles described herein.

Although particular embodiments have been described herein with reference to straight injection jets, or parallel jets into the upstream base region of concavities, other jet orientations relative to the concavities or relative to combustor/injector walls may also be employed to retain or enhance air/fuel mixing while also increasing resistance to flame-holding within a premixer. Further, the size of injection holes may vary according to the needs of a particular application and/or engine. It is further noted that while particular embodiments illustrating only a few concavities with fuel injection have been described herein, other embodiments may include various patterns, some of which may or may not employ fuel injection.

While only certain features of the invention have been illustrated and described herein, many modifications and changes will occur to those skilled in the art. It is therefore, to be understood that the appended claims are intended to cover all such modifications and changes as fall within the true spirit of the invention.

The invention claimed is:

1. A fuel injector for use in a combustor section of a gas turbine engine, comprising:
    a body having a hub that extends circumferentially around a central axis;
    a plurality of angled vanes for pre-mixing the air and fuel, each vane extending from the hub to an outer annular shroud and are arranged in a circumferential direction on the hub around the central axis, each vane having a root portion located radially near the hub and a tip portion located radially near the outer annular shroud, each vane having a leading edge and a trailing edge extending between the root portion and the tip portion, each vane being angled relative to the central axis to impart a rotational component of motion to incoming air that enters the fuel injector; and
    at least one concavity disposed on at least one of the plurality of angled vanes, the at least one concavity having a substantially spherical cross-sectional shape and including a discrete fuel hole disposed in an upstream base region of the at least one concavity for injection of fuel into a mainstream of air flowing within the at least one concavity,
    wherein the at least one concavity provides enhanced fuel-air mixing.

2. A gas turbine system, comprising:
    a gas turbine engine including a compressor section and a combustor section having a plurality of combustor cans;
    a turbine section coupled to the compressor section;
    an exhaust section for channeling exhaust gases from the gas turbine engine; and
    a fuel injector for injecting a fuel-air mixture into the combustor section, said fuel injector comprising:
        a body having a hub that extends circumferentially around a central axis;
        a plurality of angled vanes for pre-mixing the air and fuel, each vane extending from the hub to an outer annular shroud and are arranged in a circumferential direction on the hub around the central axis, each vane having a root portion located radially near the hub and a tip portion located radially near the outer annular shroud, each vane having a leading edge and a trailing edge extending between the root portion and the tip portion, each vane being angled relative to the central axis to impart a rotational component of motion to incoming air that enters the fuel injector; and
        at least one concavity disposed on at least one of the plurality of angled vanes, the at least one concavity having a substantially spherical cross-sectional shape and including a discrete fuel hole disposed in an upstream base region of the at least one concavity for injection of fuel into a mainstream of air flowing within the at least one concavity,
    wherein the at least one concavity provides enhanced fuel-air mixing.

* * * * *